United States Patent [19]

Tezuka

[11] Patent Number: 4,992,879
[45] Date of Patent: Feb. 12, 1991

[54] IMAGE PICK-UP APPARATUS

[75] Inventor: Nobuo Tezuka, Kanagawa, Japan

[73] Assignee: Canon Kabushiki Kaisha, Tokyo, Japan

[21] Appl. No.: 355,840

[22] Filed: May 18, 1989

Related U.S. Application Data

[63] Continuation of Ser. No. 911,175, Sep. 24, 1986, abandoned.

[30] Foreign Application Priority Data

Sep. 25, 1985 [JP] Japan .................................. 60-213047

[51] Int. Cl.⁵ .............................................. H04N 5/30
[52] U.S. Cl. .................................... 358/224; 358/209; 358/44; 358/310
[58] Field of Search ................... 358/224, 41, 44, 209, 358/160, 310, 335, 342; 360/27, 29.1, 61, 62

[56] References Cited

U.S. PATENT DOCUMENTS

| | | | |
|---|---|---|---|
| 3,833,758 | 9/1974 | Ferrari | 358/224 |
| 4,303,322 | 12/1981 | Someya | 358/224 |
| 4,330,797 | 5/1982 | Yokokawa | 358/224 |
| 4,366,501 | 12/1982 | Tsunekawa | 358/310 |
| 4,584,610 | 4/1986 | Mizokami | 358/224 |

Primary Examiner—Edward L. Coles, Sr.
Attorney, Agent, or Firm—Robin, Blecker, Daley & Driscoll

[57] ABSTRACT

An image pick-up apparatus arranged to convert an optical image of an object to be photographed into an electrical image signal and to record the image signal on a recording medium is provided with display means which, in reproducing the image signal recorded on the medium, displays within an optical view finder that the apparatus is in a reproducing mode.

39 Claims, 4 Drawing Sheets

FIG. 5

IMAGE PICK-UP APPARATUS

This application is a continuation of application Ser. No. 911,175, filed Sep. 24, 1986 now abandoned.

BACKGROUND OF THE INVENTION

1. Field of the Invention

This invention relates to an image pick-up apparatus arranged to convert an optical image of an object to be photographed into an electrical image signal by means of an image sensor such as a CCD and to record a still picture signal on a recording medium such as a rotary magnetic disc or the like and more particularly to an image pick-up apparatus which is capable of reproducing the recorded signal.

2. Description of the Related Art

There is known an electronic camera system of the kind arranged to convert an optical image of an object into an electrical image signal by means of an image sensor such as a CCD, to divide the signal into a luminance signal and a chrominance signal, to perform a signal processing operation such as frequency modulation, etc. and to record the processed signal on a recording medium such as a rotary magnetic sheet or disc or the like.

The electronic camera system of the abovestated kind features that the image recorded on the recording medium can be immediately reproduced on a display device such as a CRT by applying it to a reproducing apparatus or can be printed into a hard copy by a printer without subjecting the medium to any intermediate process.

Figure 5:
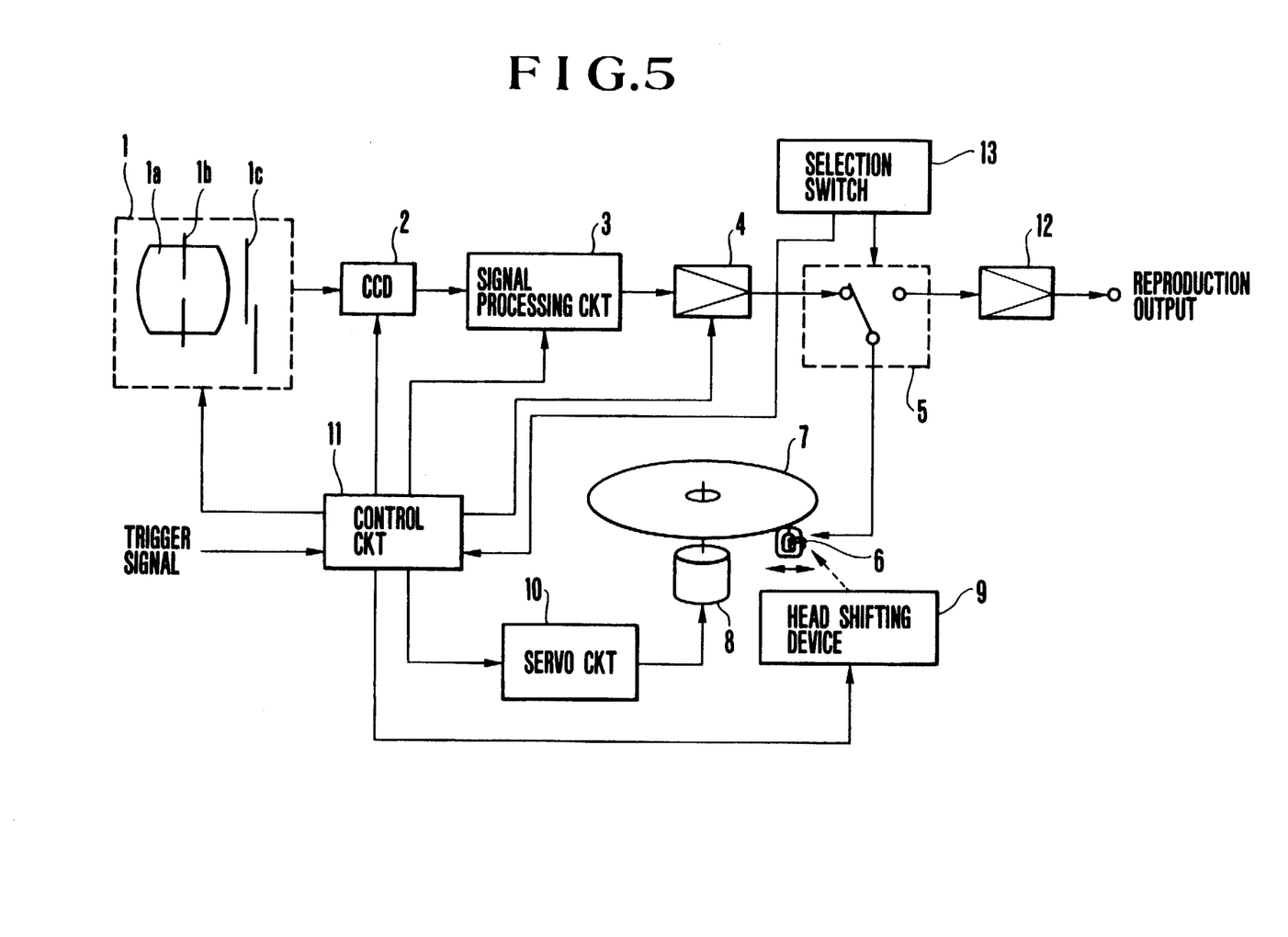
FIG. 5 is a block diagram showing the main circuit arrangement of an electronic camera which is capable of performing both recording and reproduction.

It is conceivable that, in reproducing an image recorded by the above-stated electronic camera system, the reproduction can be accomplished by the camera system itself without recourse to any reproducing apparatus. An electronic camera embodying such a concept reproduces the recorded image by utilizing, as they are, a drive device for driving the recording medium, a magnetic head and a driving part provided for driving it. FIG. 5 of the accompanying drawings shows in a block diagram the arrangement of the electronic camera which is capable of performing a reproducing operation as well as recording.

Referring to FIG. 5, an optical system block 1 includes a photo-taking lens 1a, a diaphragm 1b and a shutter 1c. The light of an object to be photographed passes through the block 1 to form an image on the image pick-up surface of a CCD 2. The image is then converted into an electrical image signal. The image signal which is thus produced from the CCD 2 is divided at a signal processing circuit 3 into a luminance signal and a chrominance signal. The signal is further processed into a form suited for recording, e.g. into a frequency modulated signal or the like. The processed signal is supplied to a magnetic head 6 through a recording amplifier 4 and a switch circuit 5. A rotary magnetic disc 7 is arranged to be rotated by a spindle motor 8 at a given number of revolution such as 3,600 r.p.m. according to the NTSC system, for example. The spindle motor 8 is provided with a servo circuit 10. When one field portion of a TV signal is recorded for a still picture while the magnetic disc makes one turn, the magnetic head 6 is shifted to another recording track on the disc by a head shifting device 9. A control circuit 11 is arranged to control the above-stated circuits and devices. When a trigger signal is applied to the control circuit 11 from outside, one field portion of the TV signal is recorded on the magnetic disc 7 and then the magnetic head 6 is shifted to a new position by the head shifting device 9 for next recording. These processes are performed under the control of the control circuit 11.

In reproducing an image recorded on the magnetic disc 7, a recording/reproduction selection switch 13 is operated to switch the camera from a recording mode over to a reproducing mode. Then, this time, the output of the magnetic head 6 is produced through a reproduction amplifier 12. In this instance, it is of course possible to use devices provided on the outside of the camera for demodulation of the image signal and for making a display on a CRT or the like. However, the devices for the demodulation, the display, etc. may be arranged within the camera.

With the electronic camera thus arranged to be capable of performing reproduction as well as recording, a recording operation tends to be often attempted while the camera has been left in the reproduction mode by an oversight. In such a case, the operator either misses a good shutter chance or tends to mistake the condition of the camera for being out of order.

SUMMARY OF THE INVENTION

A first object of this invention is to provide an image pick-up apparatus which solves the abovestated problem to prevent any erroneous operation that results from the problem.

A second object of this invention is to provide an image pick-up apparatus which is arranged under the first object to enable the operator without fail to know whether or not the apparatus is set in the reproduction mode thereof.

To attain this object, an image pick-up apparatus which is arranged to convert an optical image of a photographing object into an electrical image signal and to record the image signal on a recording medium is provided according to this invention with display means for displaying within a view finder that the apparatus is in the reproduction mode when the image signal recorded on a recording medium is to be reproduced.

A third object of this invention is to provide an image pick-up apparatus which is capable of having access to a suitable point on a recording medium according to a selected mode when the apparatus is switched from a recording mode over to a reproduction mode and vice versa.

It is another object of this invention to provide an apparatus which is arranged to shift the position of a head for recording or reproduction with simple structural arrangement.

Further objects and features of this invention will become apparent from the following detailed description of embodiments thereof taken in connection with the accompanying drawings.

DETAILED DESCRIPTION OF THE PREFERRED EMBODIMENTS

Figure 2:
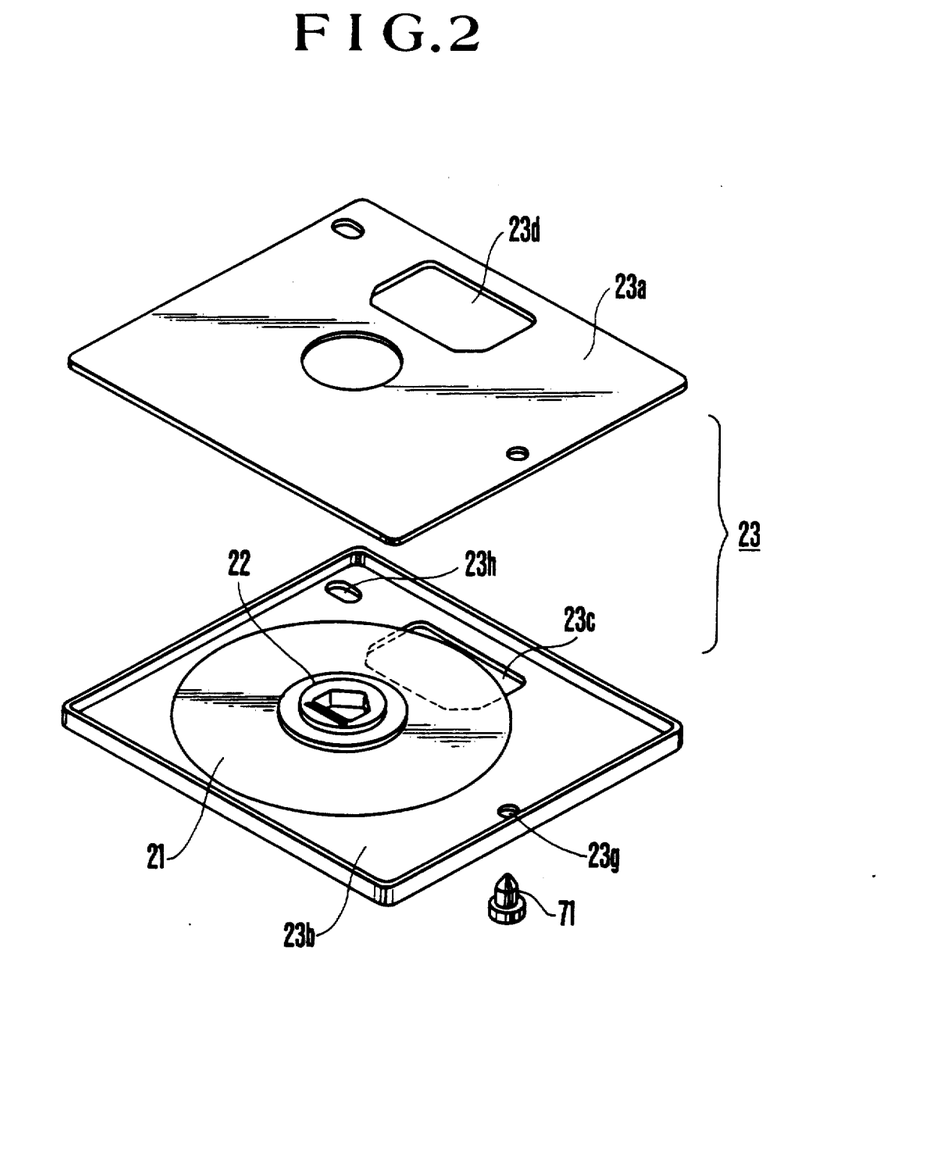
FIG. 2 is an exploded view showing a magnetic disc cassette suited for use by the embodiment of this invention.

FIG. 2 shows in an exploded oblique view a magnetic disc which is suited for use by an electronic camera embodying this invention together with a cassette which is arranged to house the magnetic disc. Referring to FIG. 2, the magnetic disc 21 is provided with a center hub 22 which is disposed in the middle part of the disc 21 and is arranged in one unified body with the disc 21 to be coupled with a spindle which is arranged to rotate and drive the magnetic disc. The magnetic disc 21 is rotatably placed within the cassette 23, which is composed of an upper plate 23a and a lower plate 23b. The lower plate 23b is provided with an aperture 23c which permits a magnetic head to enter the cassette. The upper plate 23a is provided with an aperture 23d which permits a stabilizer plate to enter the cassette for stabilizing the rotation of the magnetic disc 21. The lower plate 23b is further provided with positioning holes 23g and 23h for positioning the disc cassette 23 relative to a disc drive device which is included in the camera. When the cassette 23 is loaded on the disc drive device, a positioning pin 71 and another pin which are provided on the disc drive device come to enter the holes 23g and 23h to position the cassette 23.

Figure 3:
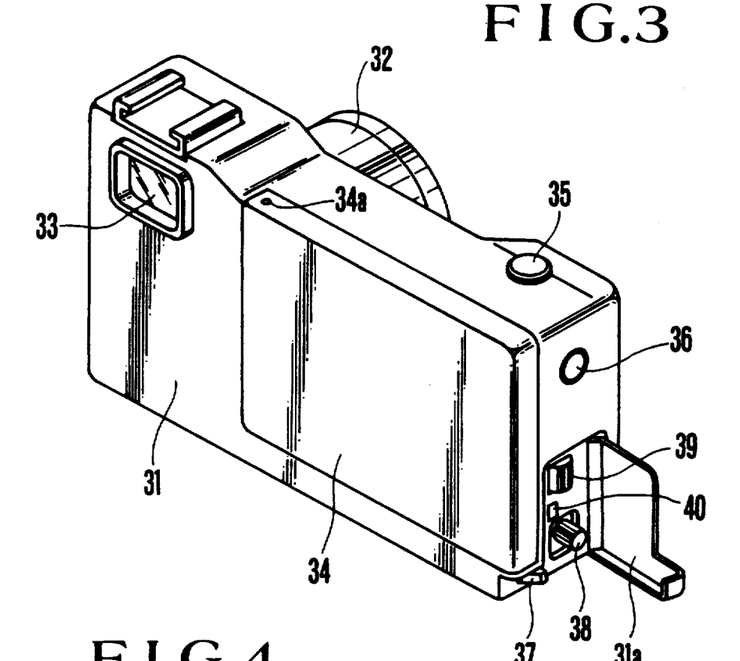
FIG. 3 is an oblique view showing the appearance of the electronic camera arranged according to this invention to be capable of performing both recording and reproduction.

FIG. 3 shows in an oblique view the appearance of the electronic camera arranged as an embodiment of this invention. The illustration includes the body 31 of the electronic camera, which incorporates therein an optical system, circuits and devices as will be described later with reference to FIG. 1. The camera is provided with a photo-taking lens barrel 32; a view finder 33; and a lid 34 of a cassette mount which is to be used in mounting the cassette 23. The mount lid 34 is arranged to be turnable clockwise on a hinge 34a in inserting and removing the cassette 23 into and out of a given position on the camera. A trigger button 35 is arranged to operate in the same manner as in the case of an ordinary camera using a silver based film. An external connection terminal 36 is provided for connecting the electronic camera to an external monitor or the like in performing a reproducing operation. The camera is further provided with a recording/reproduction selecting operation member 37; a manual operation knob 38 to be operated to shift the head position from one track to another during reproduction; a manual operation knob 39 to be operated for tracking control during reproduction; and a window 40 which is arranged to show a track number during reproduction. These parts 37 to 40 are normally covered with a lid 31a and are thus arranged not to hinder a photo-taking or image pick-up operation.

Figure 1:
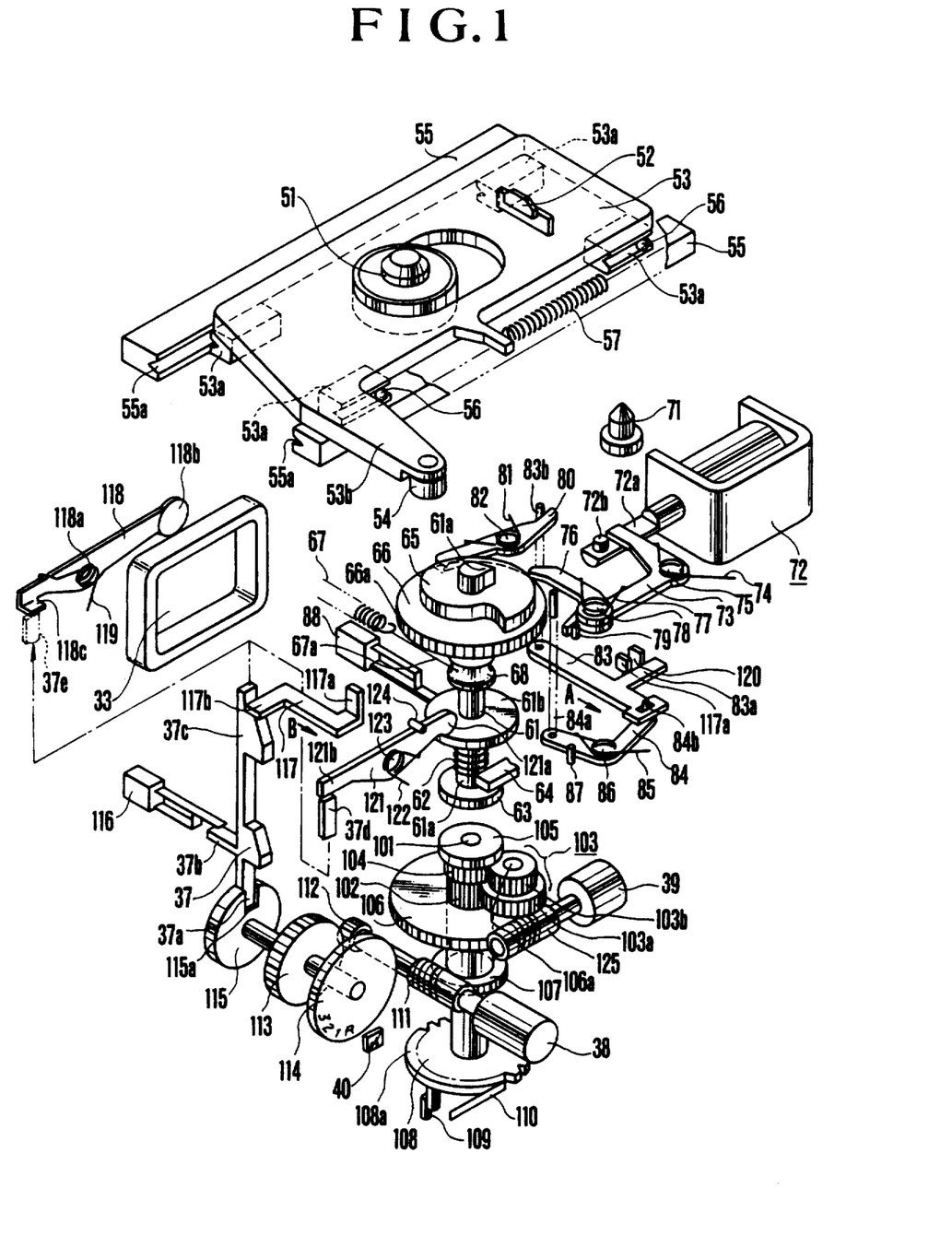
FIG. 1 is an exploded view showing the head driving system of an electronic camera which is arranged according to this invention to be capable of performing both recording and reproduction.

FIG. 1 is an exploded view mainly showing the head shifting arrangement of the electronic camera shown in FIG. 3. In FIG. 1, a reference numeral 51 denotes a spindle which is arranged to engage the center hub 22 of the magnetic disc 21 and to cause the disc 21 to be rotated by the driving force of a motor (not shown) as mentioned in the foregoing with reference to FIG. 2. A magnetic head 52 is arranged to come through the aperture 23c provided in the lower plate 23b of the cassette 23 of FIG. 2 and to abut on the recording surface of the magnetic disc 21 for recording or reproducing a signal. The head 52 is mounted on a head carriage 53. The carriage 53 is carried by guides 53a which are provided with V-shaped grooves and are arranged to engage via balls 56 with the V-shaped grooves 55a provided in a pair of guide rails 55. The carriage 53 is thus arranged to smoothly shift the position of the magnetic head 52 toward the center of rotation of the spindle 51. An arm part 53b of the head carriage 53 is provided with a cam follower 54. A spring 57 is arranged to exert an urging force on the carriage 53 to urge the cam follower 54 to abut on a feed cam 65.

A rotation shaft 61 is provided with a key 61a. A disc part 61b and a clutch plate 63 are arranged in one unified body with the shaft 61. The rotation shaft 61 is axially shiftable and is normally in a state of being urged upward by a spring 62. A reference numeral 64 denotes a portion of a bearing part which is arranged to abut on the spring 62 and the upper surface of the clutch 63.

The feed cam 65 is arranged to move the head carriage 53 via the cam follower 54 and is formed in one body with a ratchet wheel 66 and a pulley 68. Ratchet teeth 66a are formed along the periphery of the ratchet wheel 66. A feed pawl 76 and a reverse rotation preventing pawl 80 are engaging the ratchet teeth 66a. The pulley 68 is under a clockwise urging force of a spring 67 which is applied via a wire 67a. The wire 67a is taken up on the periphery of the pulley 68 according as the pulley turns round counterclockwise. The feed cam 65 is provided with a hole which is arranged to engage the key 61a of the rotation shaft 61. The cam and the rotation shaft are thus arranged to rotate together in the rotating direction of the cam 65 while they are allowed to move relative to each other in the axial direction of the rotation shaft 61.

There is provided a safety switch 88 for recording. When the rotation shaft 61 is slid downward, the switch 88 is opened by the disc part 61b of the shaft and produces a signal for inhibiting recording of a signal on the magnetic disc 7.

A plunger 72 is provided with a moving piece 72a. A pawl driving lever 73 is urged to move counterclockwise on a shaft 75 by the force of a spring 74. Under a normal condition, the fore end of the lever 73 is in a state of abutting on a stopper 79. A feed pawl 76 is pivotally carried by a shaft 78 which is provided on the above-stated pawl driving lever 73. The claw part formed at the fore end of the feed pawl 76 engages the ratchet teeth 66a of the ratchet wheel 66 as the pawl is urged to move counterclockwise by a spring 77. A reverse turn preventing (or back stop) pawl 80 is urged to turn counterclockwise on a shaft 82 by the force of a spring 81. The fore end claw part of the pawl 80 also engages the ratchet teeth formed along the periphery of the ratchet wheel 66.

When a driving pulse is applied to the plunger 72, the moving piece 72a is retracted rightwardly in FIG. 1. The pawl driving lever 73 is caused to turn round clockwise by a pin 72b which is provided on the moving piece 72a. As a result, the ratchet wheel 66 is turned counterclockwise to a degree corresponding to one tooth by the feed pawl 76 and the back stop pawl 80. The cam lift of the feed cam 65 for turning the wheel 66 by one tooth is arranged to be corresponding to one track pitch on the magnetic disc 7. With the feed cam arranged in this manner, the position of the magnetic head 52 is shifted by one track pitch every time the ratchet wheel 66 is turned counterclockwise to a one-tooth degree. The rotation shaft 61 also turns round counterclockwise according as the ratchet wheel turns round counterclockwise.

A first reset lever 83 is provided with a pin 83b at one end thereof and is arranged to be movable in the direction of arrow A. When the cassette loading lid 34 of the electronic camera shown in FIG. 3 is opened, the arm part 83a of the reset lever 83 can engage a member 120 which is arranged to be movable also in the direction of arrow A. A second reset lever 84 is urged to turn counterclockwise on a shaft 86 by a spring 85. Under the condition illustrated, the lever 84 abuts on a stopper 87. The second reset lever 84 has pins 84a and 84b erected at the two ends thereof respectively. The pin 84b is engaging a slit provided in the first reset lever 83. When the first reset lever 83 moves in the direction of arrow A, the second reset lever 84 is turned round clockwise via the pin 84b against the urging force of a spring 85. Further, when the first reset lever 83 moves in the direction of arrow A, a pin 83b which is provided on the first reset lever 83 pushes one end of the back stop pawl 80 to cause the pawl 80 to turn clockwise and thus to disengage the pawl 80 from the ratchet teeth 66a of the ratchet wheel 66. When the second reset lever 84 turns clockwise, the pin 84a which is provided on the lever 84 causes the driving pawl 76 to turn clockwise and thus disengages it from the ratchet teeth 66a of the ratchet wheel 66. With the cassette loading lid 34 opened, therefore, the driving pawl 76 and the back stop pawl 80 respectively disengage the ratchet teeth 66a and the ratchet wheel 66 is brought back to its initial phase position by the urging force of the spring 67. Then, the feed cam 65 also comes back to its initial phase position.

A gear 102 is rotatably carried by a shaft 101 which is disposed concentrically with the rotation shaft 61. A worm wheel 107 and a dividing plate 108 are arranged in one unified body with the gear 102. A worm wheel 106 is rotatably carried on the outer circumferential side of the gear 102 and is provided with teeth which are arranged along the periphery of the wheel 106 to engage a worm gear 125. The shaft 106a of the wheel 106 rotatably carries a double gear 103 which consists of gears 103a and 103b. The gear 103a engages the above-stated gear 102 while the other gear 103b engages a gear 104 which is rotatably carried by the above-stated shaft 101. The gears 102, 103 and 104 and the wheel 106 jointly form a planetary gear train with the gear 102 serving as a first sun gear, the gear 104 as a second sun gear and the gear 103 as a planet gear. A friction plate 105 which is made of an elastic material is formed in one body with the gear 104 which serves as the second sun gear. The friction plate 105 is arranged to transmit the rotation of the gear 104 to the shaft 61 by abutting on the clutch plate 63 when the shaft 61 descends.

A worm gear 125 which engages the peripheral teeth of the wheel 106 is arranged in one unified body with the manual operation knob 39 which has been described in the foregoing with reference to FIG. 3. Meanwhile, another worm gear 111 which engages the worm wheel 107 rotating with the first sun gear 102 is also arranged together with the manual operation knob 38 which has been also described with reference to FIG. 3. A pinion 112 is also arranged in one body with the gear 111.

In the periphery of the dividing plate 108 which is arranged to rotate together with the first sun gear 102 are formed click notches 108a. A leaf spring 110 engages the click notches 108a. A stopper 109 is provided for the dividing plate 108.

A gear 113 is arranged to engage the abovestated pinion 112 and to have an indicating plate 114 and a control plate 115 rotate together with the gear 113. The indicating plate 114 is provided with marks "R" which indicates that the electronic camera is in the recording mode and marks "1", "2", ... which indicate reproducing track numbers. These marks on the indicating plate 114 are observable from outside of the camera via the window 40 shown in FIG. 3. The control plate 115 is provided with a slot 115a. When the indicating plate 114 is at a phase of showing the mark "R", one end 37a of the recording/reproducing mode selecting operation member 37 can be engaged with the slot 115a. The mode selecting operation member 37 is slidable upward. When the member 37 is moved up to a point at which it disengages the slot 115a of the control plate 115, the arm part 37b of the operation member 37 opens the switch 116. The switch 116 is provided for detecting the selection mode between the recording and reproducing modes of the electronic camera. With the detection switch 116 thus opened, at least the switch circuit 5 shown in FIG. 5 is shifted to the reproducing position thereof.

Referring again to FIG. 1, a lever 117 is movable in the direction of arrow B. An uprising end part 117a of the lever 117 is arranged to engage the arm part 83a of the first reset lever 83 mentioned in the foregoing. The other end 117b of the lever 117 engages the slanting part 37c of the mode selecting operation member 37. When the member 37 is uplifted to the above-stated point at which the member 38 comes to disengage the slot 115a of the control plate 115, the slanting part 37c moves the lever 117 in the direction of arrow B. As a result, the first reset lever 83 is moved via the uprising part 117a to disengage the feed pawl 76 and the back stop pawl 80 from the ratchet wheel 66 as mentioned in the foregoing.

A change-over lever 121 is urged by a spring 122 to turn counterclockwise on a shaft 123. A stopper 124 is arranged for the lever 121. One end of the lever 121 is positioned on the disc 61b which is arranged in one body with the rotation shaft 61. Under the condition as shown in FIG. 1, the end part 121a of the lever 121 is not in contact with the disc 61b. The other end 121b of the lever 121 is arranged to be capable of engaging one end 37d of the mode selecting operation member 37.

When the mode selecting operation member 37 is uplifted to disengage it from the slot 115a of the control plate 115 as mentioned above, the change-over lever 121 is turned round clockwise. Then, the fore end 121a of the lever 121 pushes the disc 61b downward. With the rotation shaft 61 thus pushed down by the change-over lever 121, the feed pawl 76 and the back stop pawl 80 are disengaged from the ratchet wheel 66. Meanwhile, the clutch plate 63 then comes to abut on the friction plate 105. Therefore, the rotating force of the second sun gear 104 is transmitted to the cam 65 via the friction plate 105 and the clutch plate 63.

A warning lever 118 is urged by a spring 119 to turn counterclockwise on a shaft 118a. One end 118b of the lever 118 forms a warning display part or indicium which is arranged to give a warning when the camera is in the reproducing mode as will be further described later on. The other end 118c of the lever 118 is arranged to abut on one end 37e of the mode selecting operation member 37 or one end of some other member which is arranged to operate in association with the member 37.

In the case of the recording mode which is as shown in FIG. 1, the warning display part 118b is located outside of the visual field of the view finder 33 of the electronic camera. Under this condition, when the mode selecting operation member 37 is moved upward to disengage the fore end 37a of the member 37 from the slot 115a of the control plate 115, the warning display part 118b enters the visual field of the view finder 33 as the lever 118 is then turned round clockwise by one end 37e of the member 37. Therefore, when the electronic camera is shifted to the reproducing mode, a warning display is made within the visual field of the view finder 33 by the display part 118b arranged at the fore end of the warning lever 118.

In the recording mode, the camera which is arranged as described above operates in the following manner: In this case, the fore end 37a of the mode selecting operation member 37 is engaging the slot 115a of the control plate 115 as shown in FIG. 1. Therefore, the clutch plate 63 and the friction plate 105 are not contacting with each other. The display part 118b of the warning lever 118 is located outside of the visual field of the view finder 33. The cassette 23 is loaded under this condition. Then, under the control of the control circuit 11 of FIG. 5 which is performed in response to the output of detecting means (not shown), a driving pulse is applied to the plunger 72. The head carriage 53, i.e. the magnetic head 52, is then shifted to a non-recorded track position on the disc through the ratchet wheel 66 and the cam 65. A recording operation is performed on the magnetic disc 7. Upon completion of recording, a recording completion signal causes a driving pulse to be applied to the plunger 72. The head 52 is thus shifted to the extent of one track pitch every time one performance of recording comes to an end.

In taking the cassette 23 out of the loading part of the camera, the member 120 moves in the direction of arrow A in response to the opening action of the lid 34. This movement disengages the feed pawl 76 and the back stop pawl 80 from the ratchet wheel 66. The ratchet wheel 66 and the feed cam 65 are brought back to their initial phase positions by the urging force of the spring 67. When the cassette loading lid 34 is closed, the member 120 again moves backward to permit a feeding action by means of the feed pawl 76 and the back stop pawl 80.

When the camera is shifted to the reproducing mode by moving the mode selecting manual operation member 37 upward as viewed on FIG. 1, the embodiment operates as follows: In this instance, the feed pawl 76 and the back stop pawl 80 are disengaged from the ratchet wheel 66 through the lever 117 as mentioned in the foregoing. Then, the rotation shaft 61 is moved downward via the lever 121. The clutch plate 63 and the friction plate 105 then come into contact with each other. Even if the rotation shaft 61 has turned round to an intermediate phase during this process, the ratchet wheel 66, the feed cam 65 and the shaft 61 come back to their initial phase positions. Meanwhile, the display part 118b of the warning lever 118 enters the visual field of the view finder 33 to indicate that the electronic camera is in the reproducing mode.

When the track knob 38 is turned round under this condition, the turning force is transmitted to the feed cam 65 via the worm gear 111, the worm wheel 107, the first sun gear 102, the planet gears 103a and 103b, the second sun gear 104, the friction plate 105, the clutch plate 63 and the shaft 61. As a result, the position of the head 52 is shifted. In the case of this embodiment, the dividing plate 108 is provided with V-shaped notches which are arranged along the outer circumference thereof to have the leaf spring 110 come to engage them every time the phase of the plate 108 shifts to a degree corresponding to one track pitch of the disc. The display or indicating plate 114 has a track number marked thereon for every track, so that the applicable track number of the track being subjected to a reproducing operation can be found through the window 40. In performing tracking control during reproduction, the knob 39 is turned to move for fine adjustment of the feed cam 65 through the worm gear 125, the head carriage 106, the planet gear 103, the second sun gear 104 and the friction plate 105. By virtue of this arrangement, the position of the head 52 can be precisely adjusted to the recording track while watching the condition of an image being reproduced. In other words, tracking control thus can be accurately accomplished.

In shifting the camera from the reproducing mode back to the recording mode, the track shifting operation knob 38 is turned round until the indicating plate 114 comes to show the mark "R". Then, the condition of the camera comes back to the condition as shown in FIG. 1. In other words, with the indicating plate 114 brought back to the indicating position "R", the mode selecting operation member 37 is moved downward jointly by the force of the spring 119 of the lever 118 and that of the spring 122 of the lever 121. One end 37a of the member 37 engages the slot 115a of the control plate 115. Meanwhile, the head 52 is reset in its initial position by the operation of the abovestated knob 38.

Figure 4:
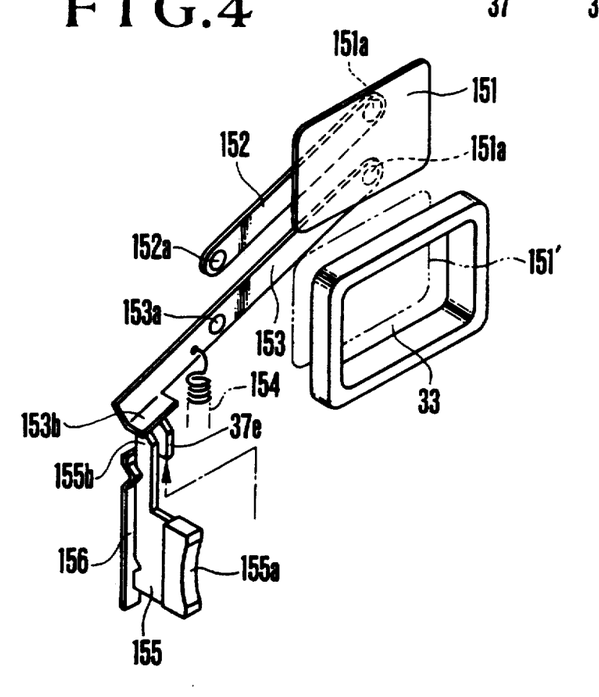
FIG. 4 is an oblique view showing the essential parts of another embodiment of this invention which is arranged in a manner different from the embodiment shown in FIG. 1.

FIG. 4 shows a modification example, wherein the warning display member which gives a warning when the camera is in reproducing mode is replaced with an eyepiece shutter 151 which is arranged for the view finder 33. Referring to FIG. 4, the eyepiece shutter 151 is located outside the optical path of the view finder when it is in the position as shown by a full line and is located to cover the view finder 33 when it is in the position as shown by a two-dot chain line 151'. With the eyepiece shutter in the latter position, it prevents the reverse incidence of light.

The eyepiece shutter 151 is provided with two pins 151a. The two pins 151a, two links 152 and 153 and their rotation shafts 152a and 153 are jointly arranged to make the so-called parallel link motion. A spring 154 exerting a turning force on the link 153 to urge it to turn on the shaft 153a. An eyepiece shutter operation member 155 is provided with an operation part 155a which is arranged to permit an operation thereon from outside of the camera. The operation member 155 is further provided with two click notches which are arranged to engage a leaf spring 156. When the operation part 155a is pushed upward, the fore end 155b pushes one end 153b of the link 153 to shift the position of the eyepiece shutter 151 to the position 151' indicated by the two-dot chain line. It goes without saying that the eyepiece shutter 151 can be brought back to the position indicated by the full line by pushing the operation part 155a downward.

When the recording/reproducing mode selecting operation member 37 is pushed down to select the reproducing mode as mentioned in the foregoing with reference to FIG. 1, one end 153b of the link 153 is pushed upward by the fore end of the member 37 or a member operating in association therewith Then, in that instance, the eyepiece shutter 151 is also shifted to the two-dot chain line position 151'. When the camera is brought back to the recording mode as shown in FIG. 1, the eyepiece shutter 151 comes back to the full-line position of FIG. 4.

In the embodiment described, a warning display is made by partly covering the optical path of the view finder when the camera is in the reproducing mode. This arrangement of course may be replaced with some different arrangement of using such electrical display means as an LED. However, the warning display can be more effectively made by covering a portion of the view finder optical path. Furthermore, with the eyepiece shutter utilized for this display purpose as an additional function thereof, the arrangement effectively permits reduction in cost as it obviates the necessity of separately arranging additional display means.

The camera, or the image pick-up apparatus, according to this invention greatly facilitates operations by the operator by virtue of the arrangement to make a display within the view finder informing the operator that the camera is in the recording mode. This effectively urges the operator to shift the camera to the recording mode in performing a next recording operation, so that recording can be prevented from being performed in an erroneous manner.

What is claimed is:

1. An image pick-up apparatus comprising:
   (a) means for converting incident radiation into an electrical signal;
   (b) means for recording said electrical signal on a medium;
   (c) means for reproducing an electrical signal recorded on said medium;
   (d) a view finder having a visual field arranged to permit observation of said incident radiation;
   (e) means for selection of a reproducing mode for operation of said reproducing means or a recording mode for operation of said recording means; and
   (f) means for displaying a warning indicium in said visual field of said view finder indicative of the selection of said reproducing mode.

2. An image pick-up apparatus of claim 1, wherein said warning indicium is arranged to occupy at least a portion of said visual field of said view finder.

3. An image pick-up apparatus of claim 1, wherein said warning indicium comprises an eyepiece shutter which is arranged to occupy at least a portion of said visual field of said view finder.

4. An image pick-up apparatus of claim 1, wherein said converting means includes:
   (a) an image sensor for converting said incident radiation into said electrical signal; and
   (b) optical means for imaging said incident radiation onto said image sensor.

5. An image pick-up apparatus of claim 1, wherein said medium is in a disc-like shape.

6. An image pick-up apparatus of claim 1, wherein said view finder is an optical view finder.

7. An image pick-up apparatus comprising:
   (a) means for recording on a medium a signal corresponding to an image incident on said apparatus;
   (b) means for reproducing a signal recorded on said medium;
   (c) a view finder having a visual field arranged to permit observation of said image; and
   (d) means for selectively displaying within said visual field of said view finder a warning indicium indicative of a condition of said reproducing means.

8. An image pick-up apparatus of claim 7, wherein said warning indicium is arranged to occupy a portion of said visual field of said view finder when said reproducing means is in said condition.

9. An image pick-up apparatus of claim 7, wherein said warning indicium comprises an eyepiece shutter which is arranged to occupy a portion of said visual field of said view finder.

10. An image pick-up apparatus of claim 7, wherein said recording means includes means for converting said image into such signal for recording.

11. An image pick-up apparatus of claim 7, wherein said medium is in a disc-like shape.

12. An apparatus of claim 7, wherein said view finder is an optical view finder.

13. An image pick-up device comprising:
    (a) means for converting an incident radiation into an electrical signal;
    (b) means for recording said electrical signal on a medium;
    (c) means for reproducing an electrical signal recorded on said medium;
    (d) a view finder having a visual field arranged to observe an object;
    (e) means for selection of a reproducing mode for operation of said reproducing means or a recording mode for operation of said recording means; and
    (f) means for displaying an information using an indicium in said view finder, said displaying means changing its display on the basis of the selection by said selection means.

14. An image pick-up device of claim 13, wherein said indicium is arranged to occupy at least a portion of said visual field of said view finder.

15. An image pick-up device of claim 13, wherein said indicium comprises an eyepiece shutter which is arranged to occupy at least a portion of said visual field of said view finder.

16. An image pick-up device of claim 13, wherein said converting means includes:
    (a) an image sensor for converting said incident radiation into said electrical signal; and
    (b) optical means for imaging said incident radiation onto said image sensor.

17. An image pick-up device of claim 13 wherein said medium is in a disc-like shape.

18. An image pick-up device of claim 13, wherein said view finder is an optical view finder.

19. An image pick-up system comprising:
    (a) means for converting incident radiation into an electrical signal;
    (b) means for recording said electrical signal on a medium;
    (c) means for reproducing an electrical signal recorded on said medium;
    (d) a view finder having a visual field arranged to permit observation of said incident radiation;
    (e) means for displaying an information using an indicium in said view finder;
    (f) means for selection of a reproducing mode for operation of said reproducing means or a recording mode for operation of said recording means; and
    (g) means for controlling said display means in accordance with the selection of said selection means.

20. An image pick-up system of claim 19, wherein said indicium is arranged to occupy a portion of said visual field of said view finder.

21. An image pick-up system of claim 19, wherein said indicium comprises an eyepiece shutter which is arranged to occupy a portion of said visual field of said view finder.

22. An image pick-up system of claim 19, wherein said recording means includes means for converting said image into such signal for recording.

23. An image pick-up system of claim 19, wherein said medium is in a disc-like shape.

24. An apparatus of claim 19, wherein said view finder is an optical view finder.

25. An image pick-up apparatus comprising:
(a) means for converting incident radiation into an electric signal;
(b) means for recording said electrical signal on a medium;
(c) means for reproducing an electrical signal recorded on said medium;
(d) an optical view finder having a visual field arranged to permit observation of said incident radiation;
(e) means for selection of a reproducing mode for operation of said reproducing means or a recording mode for operation of said recording means; and
(f) display means for conveying information about said reproducing means or said recording means in said view finder, said displaying means changing its display state on the basis of the selection by said selection means.

26. An image pick-up apparatus of claim 25, wherein said display means is arranged to occupy at least a portion of said visual field of said view finder.

27. An image pick-up apparatus of claim 25, wherein said display means comprises an eyepiece shutter which is arranged to occupy at least a portion of said visual field of said view finder.

28. An image pick-up apparatus of claim 25, wherein said converting means includes:
(a) an image sensor for converting said incident radiation into said electrical signal; and
(b) optical means for imaging said incident radiation onto said image sensor.

29. An image pick-up apparatus of claim 25 wherein said medium is in a disc-like shape.

30. An image pick-up apparatus comprising:
(a) means for converting incident radiation into an electrical signal;
(b) means for recording said electrical signal on a medium;
(c) means for reproducing an electrical signal recorded on said medium;
(d) an optical view finder having a visual field arranged to permit observation of said incident radiation;
(e) display means for conveying information about said recording means or said reproducing means in said view finder;
(f) means for selection of a reproducing mode for operation of said reproducing means or a recording mode for operation of said recording means; and
(g) means for controlling said display means in accordance with the selection of said selection means.

31. An image pick-up apparatus of claim 30, wherein said display means is arranged to occupy a portion of said visual field of said view finder.

32. An image pick-up apparatus of claim 30, wherein said display means comprises an eyepiece shutter which is arranged to occupy a portion of said visual field of said view finder.

33. An image pick-up apparatus of claim 30, wherein said recording means includes means for converting said image into a recording image signal for recording.

34. An image pick-up apparatus of claim 30, wherein said medium is in a disc-like shape.

35. An image pick-up apparatus comprising:
(a) means for recording on a medium a signal corresponding to an image incident on said apparatus;
(b) means for reproducing a signal recorded on said medium;
(c) an optical view finder having a visual field arranged to permit observation of said image;
(d) means for selection of a reproducing mode for operation of said reproducing means or a recording mode for operation of said recording means; and
(f) display means for conveying information about said reproducing means or said recording means in said optical view finder, said display means changing in its display state on the basis of the selection by said selection means.

36. An image pick-up apparatus of claim 35, wherein said display means is arranged to occupy a portion of said visual field of said view finder.

37. An image pick-up apparatus of claim 35, wherein said display means comprises an eyepiece shutter which is arranged to occupy a portion of said visual field of said view finder.

38. An image pick-up apparatus of claim 35, wherein said recording means includes means for converting said image into a recording image signal for recording.

39. An image pick-up apparatus of claim 35, wherein said medium is in a disc-like shape.

* * * * *